United States Patent
Reid et al.

(10) Patent No.: US 6,990,722 B2
(45) Date of Patent: Jan. 31, 2006

(54) METHOD AND APPARATUS FOR CONNECTING A FASTENER ELEMENT TO A WALL

(75) Inventors: Leonard F. Reid, Issaquah, WA (US); Timothy H. Johnson, Seattle, WA (US); David A. Gorton, Seattle, WA (US); Mark R. Weiss, Seattle, WA (US); Dean C. Madden, Coppell, TX (US); Alec K. Hitchman, Renton, WA (US)

(73) Assignee: Fatigue Technology, Inc., Seattle, WA (US)

( * ) Notice: Subject to any disclaimer, the term of this patent is extended or adjusted under 35 U.S.C. 154(b) by 0 days.

(21) Appl. No.: 10/893,447

(22) Filed: Jul. 16, 2004

(65) Prior Publication Data
US 2005/0000081 A1    Jan. 6, 2005

Related U.S. Application Data

(60) Continuation of application No. 10/225,594, filed on Aug. 22, 2002, now Pat. No. 6,792,657, which is a division of application No. 09/546,359, filed on Apr. 10, 2000, now Pat. No. 6,487,767.

(51) Int. Cl.
*B21D 39/00* (2006.01)

(52) U.S. Cl. ............ 29/522.1; 29/524.1; 29/525; 29/525.01; 29/525.05; 29/525.06; 29/525.11; 29/243.518; 72/370.01; 72/370.07; 72/391.4; 72/391.8

(58) Field of Classification Search ............ 29/522.1, 29/524.1, 525, 525.01, 525.05, 525.06, 525.11, 29/243.522, 243.521, 243.529, 243.518, 29/509, 24.518; 411/34, 38; 72/114, 391.8, 72/391.4, 370.01, 370.07
See application file for complete search history.

(56) References Cited

U.S. PATENT DOCUMENTS

| 2,188,422 A | 1/1940 | Waner ..................... 85/40 |
| 2,358,703 A | 9/1944 | Gookin .................... 218/19 |
| 2,384,347 A | 9/1945 | Schutz .................... 218/19 |

(Continued)

FOREIGN PATENT DOCUMENTS

GB          424241          2/1935

*Primary Examiner*—Essama Omgba
(74) *Attorney, Agent, or Firm*—Seed IP Law Group LLC

(57) ABSTRACT

A tubular fastener element is inserted into an opening in a wall until a flange at the trailing end of the fastener element is in contact with the wall. Then, an externally threaded end of a rod is inserted into a center opening in the fastener element from the flange side of the wall and is mated with internal threads in the fastener element beyond the second side of the wall. A tubular mandrel that surrounds the rod is moved into contact with the entrance portion of the center opening in the tubular fastener. The outside diameter of the mandrel is larger than the inside diameter of the center opening in the fastener element. The rod is retracted to cause a reduced thickness wall portion of the fastener element to collapse and form a second radial flange on the second side of the wall. The mandrel is forced axially into the center opening in the fastener element. This causes a tubular end portion of the fastener element that is in the opening in the wall to radially expand into tight engagement with the sidewall of the wall opening. It also cold expands the wall material surrounding the opening for fatigue enhancement of the wall material.

14 Claims, 5 Drawing Sheets

U.S. PATENT DOCUMENTS

| | | | | |
|---|---|---|---|---|
| 2,423,956 A | 7/1947 | Amtsberg | | 218/19 |
| 2,471,598 A | 5/1949 | Wilt et al. | | 218/19 |
| 2,477,056 A | 7/1949 | Gookin | | 218/19 |
| 3,136,203 A | 6/1964 | Davis | | 85/40 |
| 3,566,662 A | 3/1971 | Champoux | | 72/370 |
| 3,686,915 A | 8/1972 | Miller et al. | | 72/114 |
| 3,762,200 A | 10/1973 | Still | | 72/114 |
| 4,178,669 A | * 12/1979 | Hara et al. | | 29/412 |
| 4,192,163 A | 3/1980 | Martin | | 72/114 |
| 4,425,782 A | 1/1984 | Todisco | | 72/391 |
| 4,499,647 A | 2/1985 | Sakamura et al. | | 29/509 |
| 4,574,612 A | 3/1986 | Tanikawa | | 72/391 |
| 4,612,793 A | 9/1986 | Klein | | 72/311 |
| 4,639,175 A | 1/1987 | Wollar | | 411/38 |
| 4,705,201 A | 11/1987 | Bennett | | 227/55 |
| 4,821,555 A | 4/1989 | Kamata et al. | | 72/391 |
| 4,875,815 A | 10/1989 | Phillips, II | | 411/38 |
| 5,050,420 A | 9/1991 | Liu | | 72/391.4 |
| 5,051,048 A | 9/1991 | Maddox | | 411/34 |
| 5,096,349 A | 3/1992 | Landy et al. | | 411/108 |
| 5,135,340 A | 8/1992 | Stinson | | 411/34 |
| 5,299,442 A | 4/1994 | Graham | | 72/391.8 |
| 5,468,104 A | 11/1995 | Reid et al. | | 411/113 |
| 5,511,298 A | 4/1996 | Gasser | | 29/243.526 |
| 5,605,070 A | 2/1997 | Wille | | 72/391.4 |
| 5,729,880 A | 3/1998 | Ko | | 29/243.521 |
| 5,771,738 A | 6/1998 | Ko | | 72/391.8 |
| 5,815,906 A | 10/1998 | Johnsen | | 29/524.1 |
| 6,029,332 A | 2/2000 | Schruff | | 29/243.527 |
| 6,067,839 A | 5/2000 | Xie | | 72/391.8 |
| 6,272,899 B1 | 8/2001 | Bentivogli | | 72/391.8 |
| 6,389,676 B1 | 5/2002 | Denham | | 29/525.06 |
| 6,427,514 B1 | 8/2002 | Thiede | | 72/391.8 |
| 6,449,822 B1 | 9/2002 | Gilbert et al. | | 29/243.521 |
| 6,487,767 B1 | 12/2002 | Reid et al. | | 29/522.1 |
| 6,490,905 B1 | 12/2002 | Campbell et al. | | 72/391.8 |
| 6,497,024 B2 | 12/2002 | Fullbright | | 29/243.522 |
| 6,532,635 B1 | 3/2003 | Gregory | | 29/243.523 |
| 6,792,657 B2 * | 9/2004 | Reid et al. | | 29/243.522 |
| 6,840,075 B2 * | 1/2005 | Neri et al. | | 72/114 |
| 6,868,757 B2 * | 3/2005 | Hufnagl et al. | | 81/55 |
| 2004/0022596 A1 * | 2/2004 | Belanger | | 411/34 |
| 2004/0226159 A1 * | 11/2004 | Harlow et al. | | 29/525.01 |

* cited by examiner

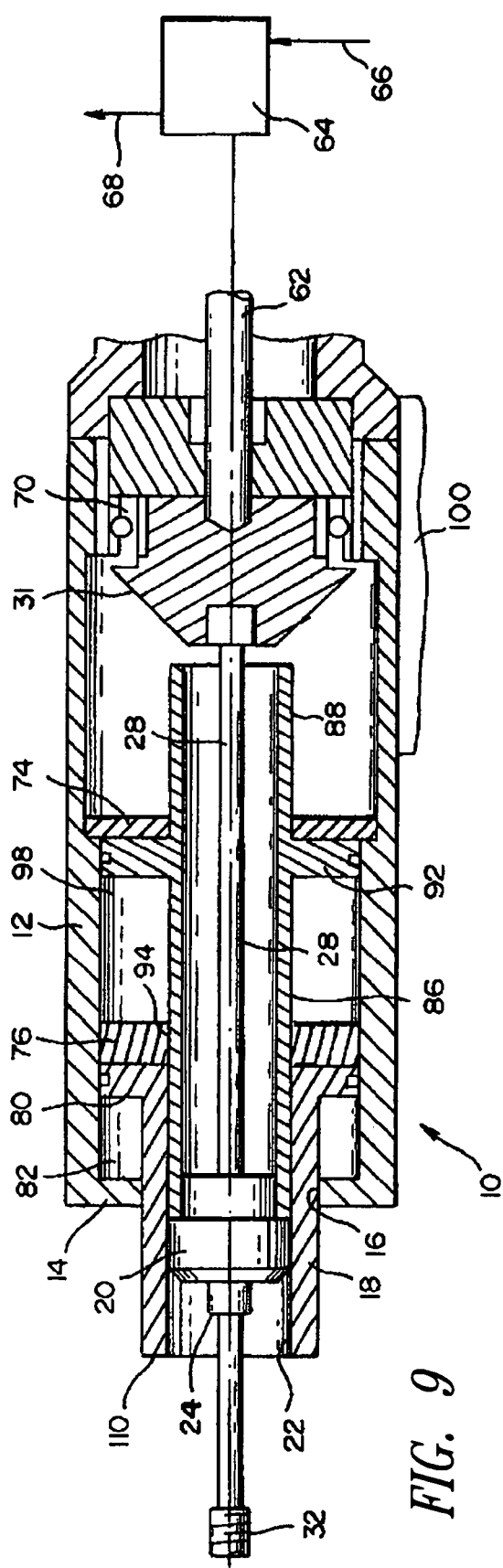
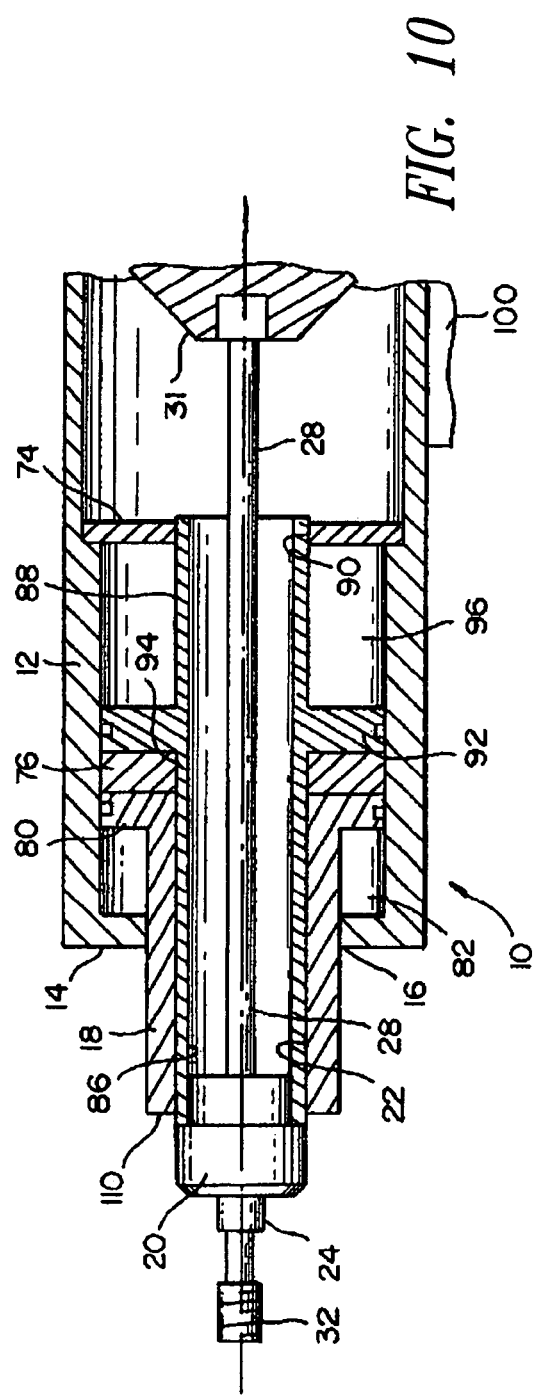
FIG. 9
FIG. 10

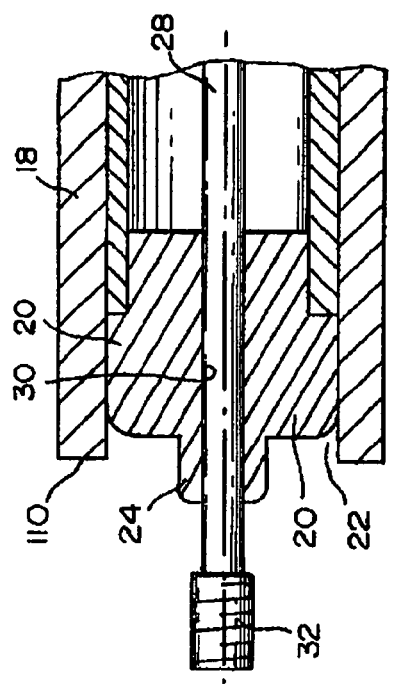
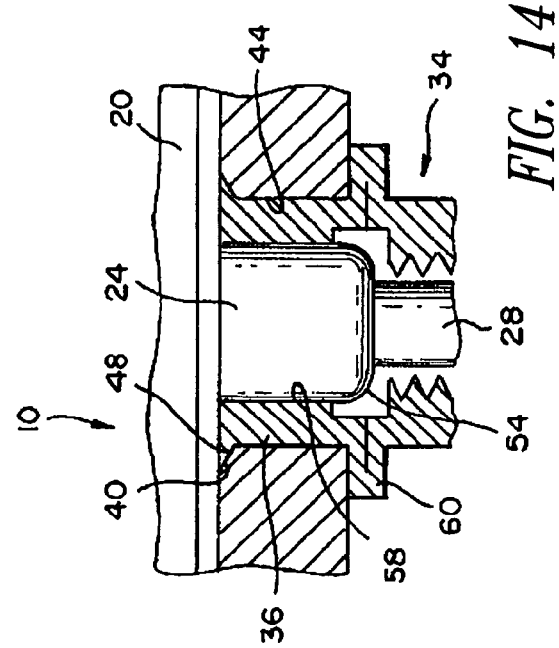
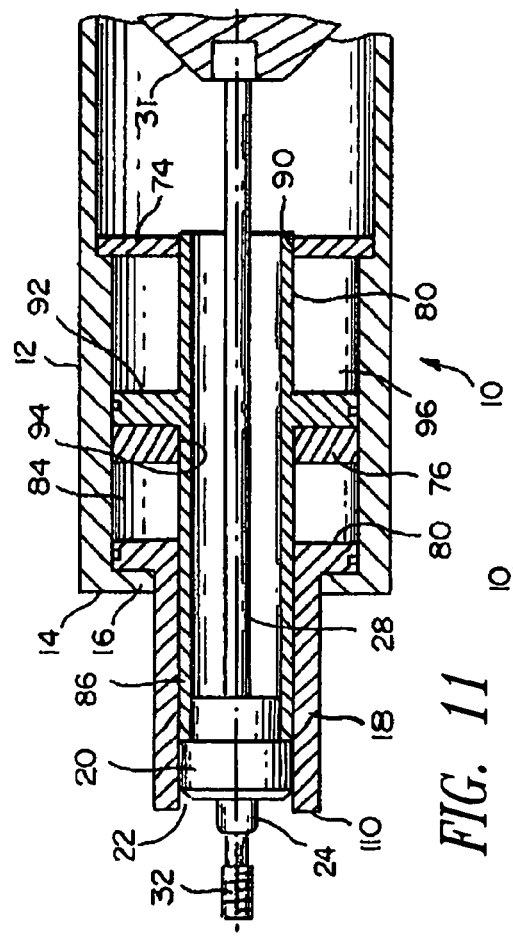
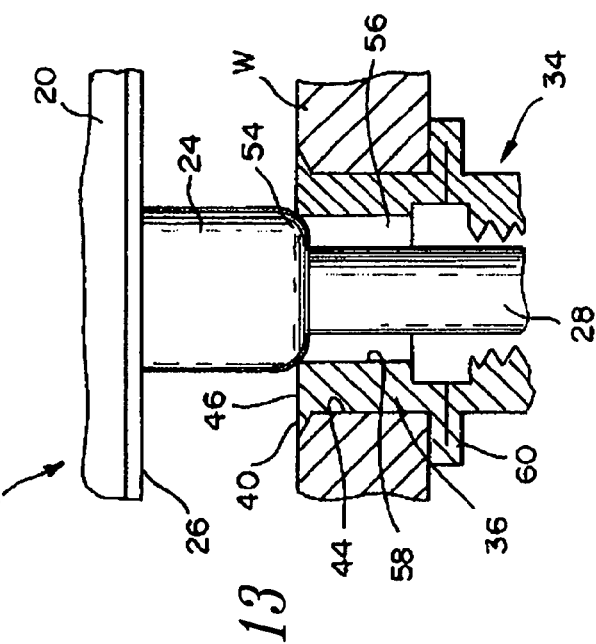

METHOD AND APPARATUS FOR CONNECTING A FASTENER ELEMENT TO A WALL

BACKGROUND OF THE INVENTION

1. Field of the Invention

This disclosure relates to a method and apparatus for connecting an internally threaded fastener element to a wall by cold expanding a non-threaded tubular portion of the fastener element within an opening in the wall and providing the fastener element with wall contacting flanges on both sides of the wall.

2. Description of the Related Art

The aerospace industry utilizes a fastener that is in the nature of a tubular rivet with internal threads. The fastener can be installed in seconds into an opening in a wall from one side of the wall. No finishing work is required once the fastener is installed. It is ready for use With clean threads available for screw attachment. This tubular rivet has a flange on one end. The opposite end is inserted into the opening in the access side of the wall and the tubular rivet is pushed into the opening until the flange is against the access of the wall. A rod with a threaded end is then inserted into the tubular rivet from the access side of the wall and is connected to threads inside the tubular rivet. Then, a hand or power tool is operated to pull on the rod. This causes a reduced wall portion of the tubular rivet on the blind side of the wall to radially bulge and form a second flange that tightly engages the blind side of the wall. A tubular rivet system of this type is currently provided by RIVNUT.RTM. Engineered Products, Inc. of Kendallville, Ind. An early form of this type of system is disclosed by U.S. Pat. No. 2,384,347, granted Sep. 4, 1945, to Michael Schultz. A problem with known tubular rivets is that they often rotate in the opening when torque is applied to a screw that is connected to the tubular rivet after it has been installed.

It is known to install a nut holder on a wall at the location of an opening in the wall and then connect a nut to the installed nut holder. A tubular stem portion of the nut holder is inserted into the opening in the wall and is then radially expanded to connect it to the wall and also cold work the wall material surrounding the opening for fatigue life enhancement. Then the nut is connected to the nut holder to provide bolt receiving threads. Examples of this type of system are disclosed by U.S. Pat. No. 5,096,349, granted Mar. 17, 1992, to Michael A. Landy, Roger T. Bolstad, Charles M. Copple, Darryle Quincey, Eric T. Esterbrook, Leonard F. Reid and Louis A. Champoux, and by U.S. Pat. No. 5,468,104, granted Nov. 21, 1995, to Leonard F. Reid and Charles M. Copple. The radial expansion locks the nut holder against rotating but these systems require attachment of a nut to provide the wall insert with the internal threads.

There is a need for a method and apparatus for installing a fastener element with internal threads in an opening in a wall in such a way that the tubular rivet is restrained against rotating in response to a bolt being threaded into the fastener element. An object of the present invention is to provide such a method and apparatus.

BRIEF SUMMARY OF THE INVENTION

In one aspect, a method of contemporaneously connecting and torsionally securing a fastener to a work piece with a tool that controls the cooperation between a rod and a mandrel wherein the rod is axially fixed with respect to the tool and free to rotate relative to the tool, the mandrel is concentrically located around and axially displaceable relative to the rod, and the mandrel has a tapered segment formed by a reduced perimeter connected with a cold working perimeter; engaging a first portion of the rod with a complementary portion of the fastener; inserting the fastener into an opening in the work piece, the complementary portion of the fastener being positioned on a blind side of the work piece and an opposing end of the fastener being positioned on an access side of the work piece; moving the tapered segment of the mandrel into contact with the opposing end of the fastener, a region of the reduced perimeter of the tapered segment at least partially positioned within an opening in the fastener while the cold working perimeter remains located slightly outside of the opening in the fastener; seating the mandrel against the opposing end of the fastener; axially drawing the rod from the blind side toward the access side of the work piece in an amount sufficient to cause buckling in a region of the fastener, the buckled region of the fastener forming a flange on the blind side of the work piece; and driving the cold working perimeter of the mandrel through the opening in at least the portion of the fastener residing between the blind side and the access side of the work piece to radially expand at least a portion of the fastener residing between the blind side and the access side of the work piece.

These and other advantages, objects, and features will become apparent from the following best mode description, the accompanying drawings, and the claims, which are all incorporated herein as part of the disclosure.

BRIEF DESCRIPTION OF THE DRAWINGS

Like reference numerals are used to designate like parts throughout the several views of the drawing, wherein:

FIG. 9 is an enlarged scale longitudinal sectional view of a part of the puller tool, with some parts shown in side elevation, such view showing a fluid motor schematically;

FIG. 10 is a view like FIG. 9, but omitting some more of the rear portion of the puller tool, such view showing the mandrel base and the mandrel extended from the position shown in FIG. 9;

FIG. 11 is a view like FIG. 10, but showing a sleeve that surrounds the mandrel base extended from the position shown in FIGS. 9 and 10;

FIG. 12 is an enlarged scale view of the front end portion of the puller tool showing the mandrel and the mandrel base in longitudinal section;

FIG. 13 is a fragmentary view showing the mandrel and portions of the mandrel base and showing the threaded rod in side elevation, such view showing the mandrel in the same position that is shown in FIG. 6; and FIG. 14 is a view like FIG. 12, but showing the mandrel in the same position that is shown in FIG. 7.

DETAILED DESCRIPTION OF THE INVENTION

Figure 1:
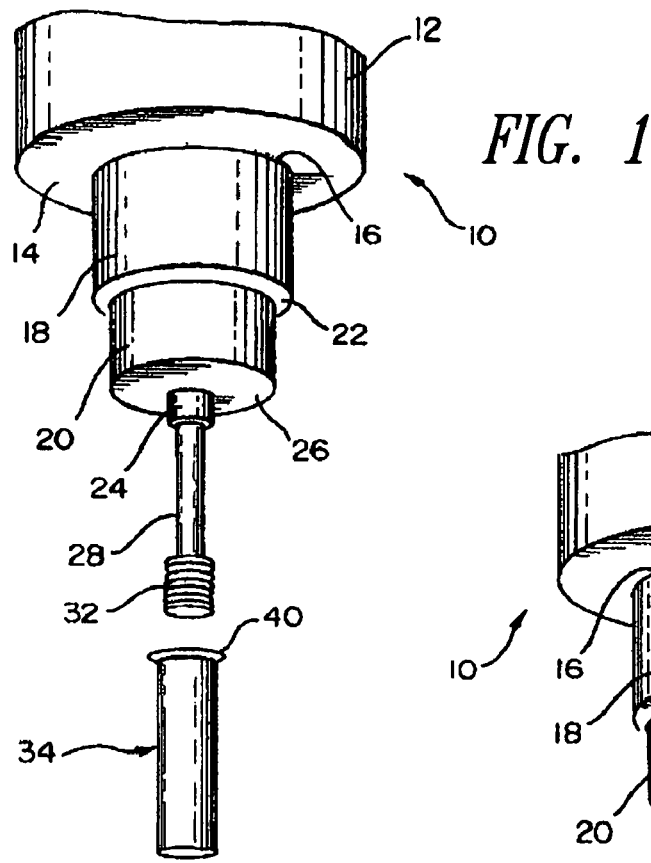
FIG. 1 is an exploded pictorial view showing the front end portion of a puller tool in a spaced relationship to a fastener element, and showing a threaded rod on the tool that is adapted for engaging the fastener element.

Referring to FIGS. 1–14, a puller tool 10 is shown to comprise an elongated tubular housing 12 having an annular front wall 14. Wall 14 includes a center opening 16 through which a tubular sleeve 18 extends. A tubular mandrel base 20 is received within a center opening 22 in sleeve 18. A tubular mandrel 24 projects axially outwardly from a radial end surface 26 on mandrel base 20. As best shown in FIG. 12, a rod 28 extends through a center opening 30 in the mandrel base 20 and the mandrel 24. As will hereinafter be described in greater detail, the inner end of the rod 28 is connected to a rotor 31 within housing 12. The outer or free end of the rod 28 includes a threaded portion 32 that is adapted to mate with threads that are inside of a fastener element 34.

Figure 4:
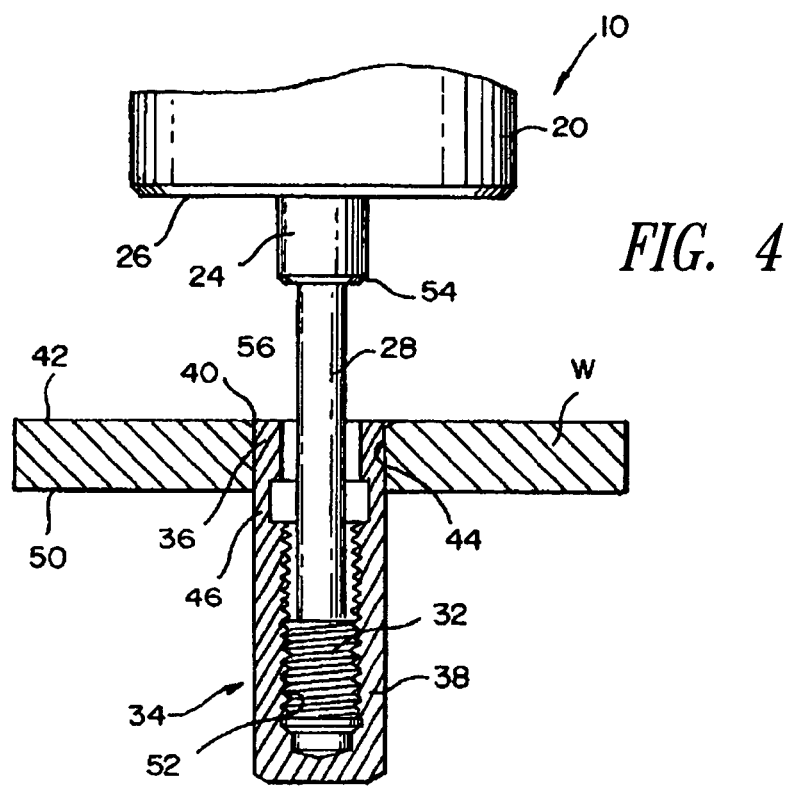
FIG. 4 is a fragmentary view showing the front end components of the puller tool in side elevation and a wall and the fastener element in longitudinal section.
Figure 5:
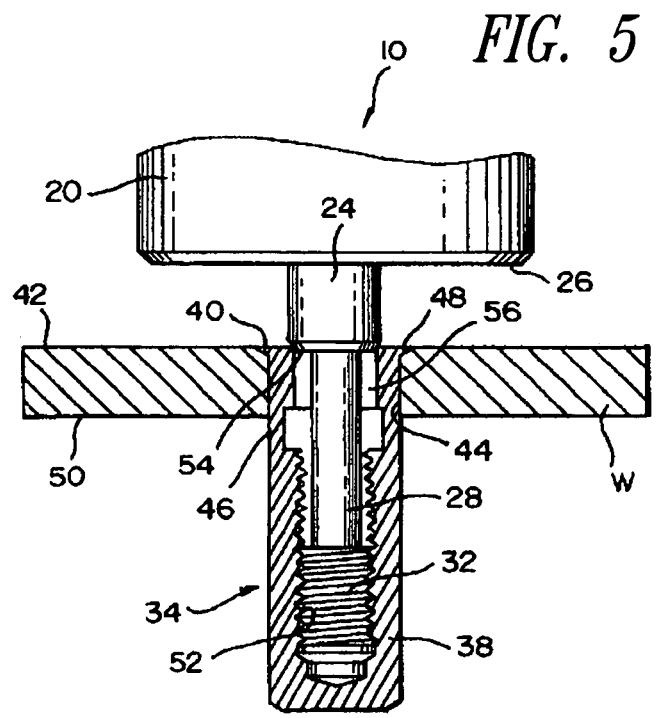
FIG. 5 is a view like FIG. 4, but showing a mandrel on the tool that is positioned to where it is ready to move into the fastener element.

Referring to FIGS. 4 and 5, the fastener element 34 has first and second opposite end portions 36, 38. End portion 36 is tubular and includes a flange 40 at its outer end. The illustrated flange 40 is adapted to fit into a tapered countersink 48 that is formed in a wall W on the first side 42 of the wall W. The countersink 48 is formed at the end of a wall opening 44 on the first side of the wall W. The tubular first end portion of the fastener element 34 includes an annular sidewall region 46 of reduced thickness. When the fastener element 34 is positioned within the wall opening 44, and the flange 40 is within the countersink 48 (FIGS. 13 and 14), the reduced thickness region 46 is positioned on the second side of the wall W closely adjacent wall surface 50.

Fastener element 34 includes an internally threaded socket 52, the threads of which mate with the threads on the threaded end portion 32 of the rod 28 (FIGS. 4–7). As shown by FIG. 5, the mandrel 24 is movable relatively along the rod 28 until its outer end 54 is in contact with the outer end of opening 56 in the tubular first end portion 36 of the fastener element 34. FIG. 13 shows that the outer end portion 54 is radiused. The outer diameter of mandrel 24 is larger than the inner diameter 58 of center opening 56 (FIG. 13). The end portion 54 of mandrel 24 has an outer end that is slightly smaller in diameter than opening 36. As a result, when the mandrel 24 is moved relatively towards the wall W, the end portion 54 of mandrel 24 is partially within the opening 56.

Figure 6:
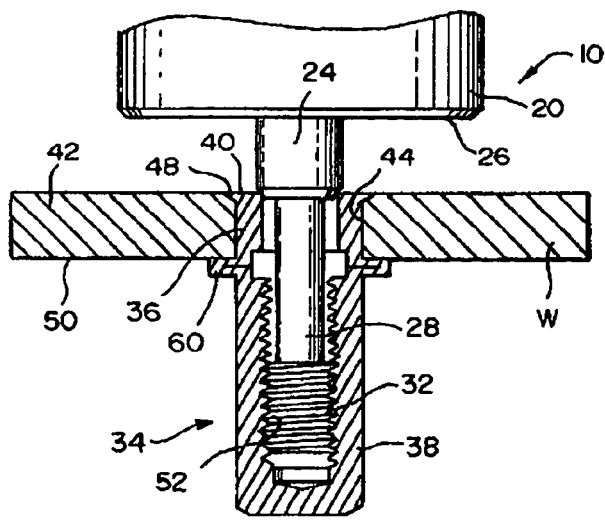
FIG. 6 is a view like FIGS. 3 and 5, but showing a relative retraction of the threaded rod for collapsing a wall portion of the fastener element so as to form a second wall engaging flange that completes a connection of the fastener element to the wall.
Figure 7:
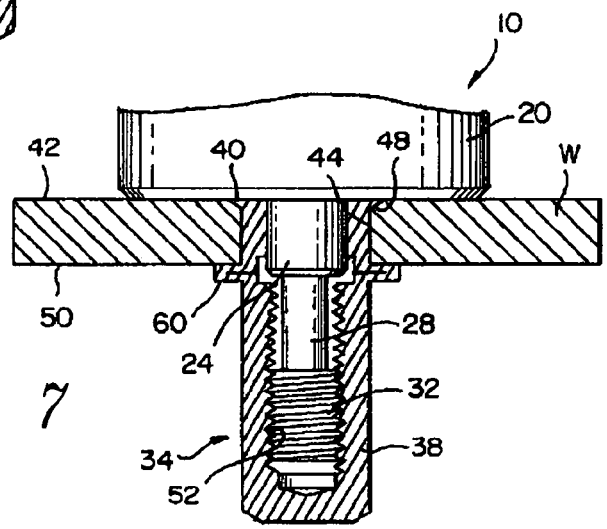
FIG. 7 is a view like FIGS. 4–6, but showing the mandrel base moved into contact with the wall and showing the mandrel moved into the portion of the fastener element that is in the opening in the wall.
Figure 8:
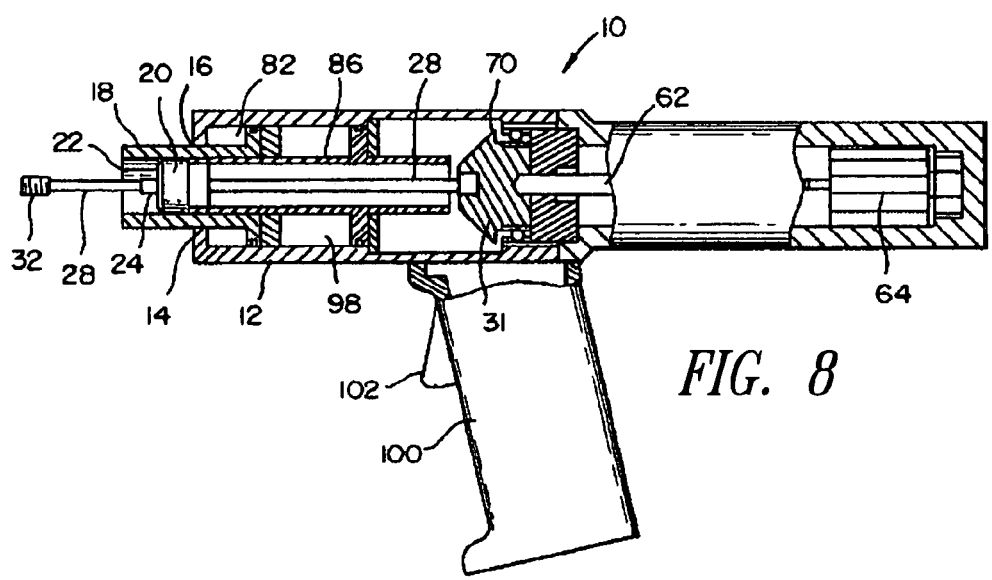
FIG. 8 is a side elevational view of an example puller tool, with some parts shown in section.

Referring to FIGS. 5 and 6, when mandrel surface 54 is at the outer end of the opening 56, and the rod 28 is pulled relatively into the mandrel 24 and the mandrel base 20, the threaded end portion 32 on rod 28 is moved towards the mandrel 24. A force is exerted on the fastener element 34 that collapses the annular sidewall region of reduced thickness 46, causing it to form a radial second flange 60. The relative pull on the rod 28 and the consequent pull on the internally threaded portion 52 of the fastener element 34 causes the flange 60 to move tight against the wall surface 50 and at the same time pull the flange 40 tight against the countersink surface 48. In a different embodiment, the flange 40 may be a radial flange having a radial inner surface that is against the surface 42 of wall W. In such embodiment, the flange 60 is still moved tight against the wall surface 50. Thus, in either embodiment, the portion of the wall W that immediately surrounds the first end portion 36 of the fastener element 34 is trapped axially between the conical flange 48, or a radial flange used in its place, and the flange 60.

In a further embodiment, the flange 40 may be omitted so that the end of the end portion 36 of fastener element 34 is flush or over flush when end portion 36 is within the opening 44. The threaded rod will hold the fastener element 34 in place, while the mandrel tapered end surface 54 extends to contact the tubular end portion 36 of the fastener element 34 and react the pull on the threaded rod 28. The rod 28 is pulled into the puller 10, causing the thin wall portion 60 to collapse against the back of the work piece W. While still holding the fastener 34 in place by use of the rod 28, the mandrel 24 is pushed into the opening 56, causing the fastener end portion 36 to be expanded into the work piece opening 44. Resistance to torque and push out are achieved by the high interference fit of the expanded fastener in the work piece opening 44. Elimination of the taper flange eliminates one of the fabrication steps, via the countersinking of the work piece opening 44 to receive the flange 40. Elimination of the taper flange eliminates one of the fabrication steps, via the countersinking of the work piece opening 44 to receive the flange 40.

Referring to FIGS. 8–14, at its end opposite the rod 28, the rotor 31 is connected to a shaft 62 that in turn is connected at its end opposite the rotor 31 to a rotary output of a rotary motor 64, shown schematically in FIG. 9 in the form of a fluid motor. FIG. 9 shows a fluid inlet 66 and a fluid outlet 68. The fluid can be compressed air that is discharged to the atmosphere. Or, it can be hydraulic fluid that is returned from the motor 64 to either a reservoir or the inlet of a pump (not shown) that pumps fluid to the motor 64. Rotor 31 is supported within housing 12 by a suitable antifriction bearing 70. The rod 28 is rotatable relative to the mandrel base 20 and the mandrel 24 but the threaded end 32 is axially fixed in position.

Referring to FIGS. 8–11, the front end portion includes radial front wall 14, a radial rear wall 74, and a radial intermediate wall 76. There is a sealed connection between the cylindrical wall 12 of the puller tool 10 and the walls 14, 74, 76. Tubular sleeve 18 extends through an opening 16 in wall 14. At its rear end, sleeve 18 includes a piston 80. Piston 80 makes a sealed sliding contact with wall 12. Sleeve 18 makes a sealed sliding contact with wall 14. A first working chamber 82 (FIGS. 9 and 10) is formed forwardly of piston 80, between piston 80 and wall 14. Chamber 82 is radially between wall 12 and sleeve 18. A chamber 84 is formed on the opposite side of piston 80, axially between piston 80 and wall 76.

The mandrel base 20 is positioned forwardly of a sleeve 86 that extends rearwardly from mandrel base 20 to a rear end portion 88 that extends through an opening 90 in wall 74. A second piston 92 projects radially outwardly from sleeve 88, at a location axially between walls 74, 76. Sleeve 86 then projects forwardly from piston 92, through an opening 94 in wall 76, onto the mandrel base 20 to which its front end is attached. A suitable seal is provided between sleeve 88 and opening 94 and between the outer periphery of the piston 92 and wall 12. A working chamber 96 is defined axially between wall 74 and piston 92 and radially between sleeve 88 and wall 12. On the opposite side of piston 92, a second working chamber 98 is formed axially between wall 76 and piston 92, and radially between sleeve 86 and wall 12.

Figure 2:
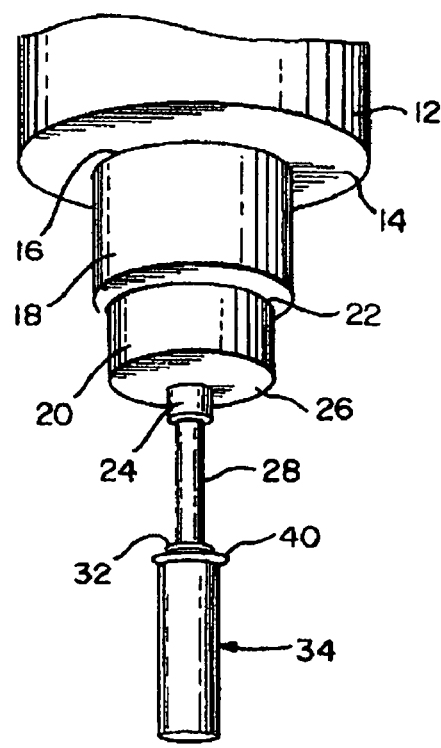
FIG. 2 is a view like FIG. 1, but showing the threaded rod entering the fastener element.
Figure 3:
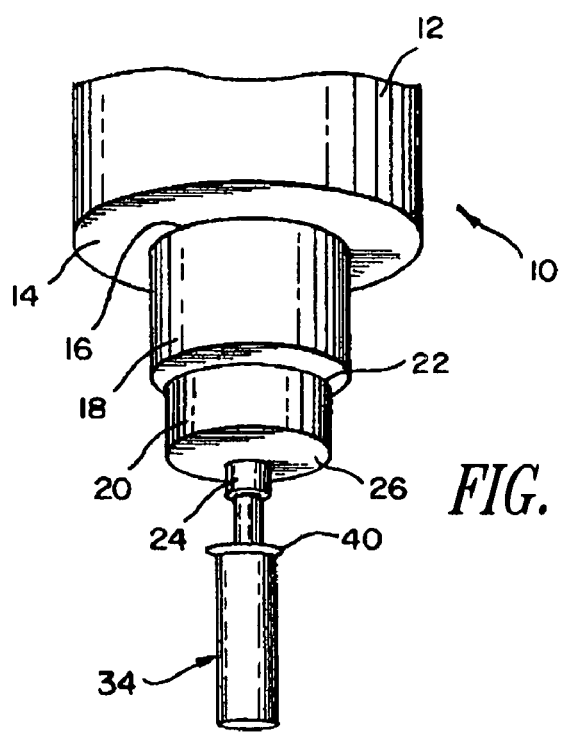
FIG. 3 is a view like FIGS. 1 and 2, but showing the threaded rod inside the fastener element.

The rotary motor 64 is rotated for the purpose of threading the threaded end portion 32 of rod 28 into or out from the threads 52 in the fastener element 34. Initially, the rod 28 and threaded portion 32 are rotated to connect the threaded portion 32 to a fastener element 34 (FIGS. 1–3). Then, after flange 60 has been formed and the end portion 36 of fastener element 34 has been attached to the wall W, the rod 28 and the threaded end portion 32 are rotated in the opposite direction, for unthreading the threaded portion 32 from the threads 52. In an alternate embodiment, the rotary motion of the mandrel can be accomplished manually in lieu of being driven by the rotary motor.

The puller tool 10 may include a pistol grip handle 100 and the necessary controls, including a trigger 102, for rotating the motor 64 either clockwise or counterclockwise, and for introducing fluid pressure into one of the working chambers 82, 84 while removing fluid from the other working chambers 82, 84, and for introducing working fluid into one or the other of the working chambers 96, 98 while removing it form the other working chamber 96, 98. Or, a coiled return spring could be put into one of the chambers and fluid put into and removed from the other chamber.

As earlier stated, the rod 28 is rotated for the purpose of threading the threaded end portion 32 of rod 28 either into or out from the internal threads 52 is a fastener element 34. The rod 28 only rotates; it does not move axially. However, relative axial movement is caused by movement of the pistons 80, 92 and the sleeves 18, 86, 88. According to a method of the invention, after a fastener element 34 is attached to the threaded end portion 32 of the rod 28 (FIG. 3), the tool 10 and fastener element 34 are moved towards the wall W, in alignment with an opening 44 in the wall W, and then the fastener element 34 is moved into and through the wall opening 44 until its flange 40 is seated on the portion of the wall W that immediately surrounds the wall opening 44. When the flange 40 is a tapered flange, it fits within a tapered countersink 48. If the flange is a straight radial flange, its inner surface would lie flat on a flat portion of wall 42 which would immediately surround the opening 44. FIG. 4 shows the rod in a relatively extended position and shows the fastener element 34 within an opening 44. Next, fluid is introduced into working chamber 96 and is removed from working chamber 98. This moves the sleeves 86, 88 and the mandrel base 20 and mandrel 24 towards the threaded end portion 32 of the rod 28. Initially, movement occurs until the mandrel 24 is in the position shown by FIG. 5, with its tapered end surface 54 contacting the perimeter of opening 56 in tubular end portion 36. Then, the sleeves 86, 88 and the mandrel base 20 and mandrel 24 are moved further towards the threaded end portion of rod 28. This causes a shortening of the distance between the threaded end portion 32 and the mandrel end surface 54. It also causes a pulling force to be exerted on the second end portion 38 of the fastener element 34, pulling it towards the wall W. Mandrel 24 exerts a reaction force on the flanged end of fastener element 34, keeping it within the opening 44. The pull on end portion 38 causes the annular sidewall region of reduced thickness 46 to collapse on itself and move radially outwardly into the position shown by FIGS. 6, 7, 13 and 14. The collapsing wall portion 46 forms the flange 60 and is moved into tight engagement with the second side 50 of wall W. At the same time, the flange 40 is moved into tight contact with the surface 48 on the first side 42 of wall W. The portion of the wall W immediately surrounding the opening 44 is clamped tightly between the two flanges 40, 60. Further movement of the threaded end portion 32 of rod 28 towards the mandrel 24, causes the mandrel 24 to be forcibly moved into the end opening 56 in fastener element 34.

As clearly shown by FIG. 13, the exterior diameter of mandrel 24 is initially larger than the internal diameter of opening 56. The tapered end surface 54 cams its way into the opening 56, causing the end portion 36 of fastener element 34 that is in the opening 44 to be expanded radially. Radial expansion of fastener portion 36 causes a radial expansion of the wall material immediately surrounding the opening 44. The portion 36 of fastener element 34 is moved into a tight frictional engagement with the side surface of opening 44 securing the fastener element 34 against rotation relative to the wall W. Radial expansion of the wall material immediately surrounding the opening 44 may also be sufficient to cold expand the wall region for fatigue enhancement. The expansion of fitting end portion 36 is sufficient to cause a permanent increase in the inside and outside diameters of the tubular end portion 36. This radial expansion of the tubular end portion 36 does two things. Firstly, it introduced fatigue life enhancing compressive residual stresses in the work piece W immediately surrounding the work piece opening 44. Secondly, it creates a high interference fit between the fitting end portion 36 and the sidewall of the opening 44. This high interference fit secures the fitting 34 to the work piece W.

For a more complete description of fatigue enhancement by cold expansion, reference is made to U.S. Pat. No. 3,566,662, granted Mar. 2, 1971, to Lewis A. Champoux, entitled "Coldworking Method and Apparatus". This patent is hereby incorporated herein by this specific reference.

As a comparison of FIGS. 8–13 will show, the annular outer end surface 110 on sleeve 18 may be positioned in contact with the wall W as one way of pulling the threaded end portion 32 of rod 28 relatively into the tool 10 (FIG. 11). Then, the sleeve 18 can be retracted (FIG. 9) in order to move the threaded end portion 32 relatively outwardly from the tool. Then, an extension of the sleeves 86, 88 may be used to move the mandrel 24 and the mandrel base 20 out from sleeve 18 while moving the threaded end portion 32 of rod 28 relatively close to the mandrel 24 and the mandrel base 20.

After a fastener element 34 has been attached to the wall W, and the mandrel 24 has been moved into the tubular end portion 36 for the purpose of radially expanding it into the opening 44, the piston 92 in the sleeves 86, 88 can be retracted for moving the mandrel 24 and the mandrel base 20 away from the threaded end portion 32 of rod 28. After the mandrel 24 is completely withdrawn from the end opening 56 in the fastener element 34, the motor 64 can be operated for rotating the rod 28 in a direction that unscrews its threads from the threads 52 inside of the fastener element 34. This unthreading is continued until the threaded end portion 32 is no longer connected to the threads 52. Then, the tool 10 can be easily moved away from the installed fastener element 32 in the hole opening 44.

The outer surface of tubular end portion 36 of fitting 34 may be machined or otherwise treated in order to give it an increase coefficient of friction. For example, when the fitting is being turned on a lathe, a series of small grooves may be formed in the outer surface of end portion 36, so as to create outwardly projecting rings between the grooves which have sharp edges and will penetrate into the sidewall of the work piece opening 44 when the end portion 36 is expanded by the mandrel 24 as described above.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The illustrated embodiments are only examples of the present invention and, therefore, are non-limitative. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A method of securing a fastener to a work piece with a tool having at least a rod and a mandrel, the tool controls the cooperation between the rod and the mandrel wherein the mandrel is concentrically located and axially displaceable relative to the rod, the mandrel having a tapered segment, the tapered segment extending between a reduced perimeter section and a cold working perimeter section, the method comprising:

engaging a first portion of the fastener with a complementary portion of the rod;

inserting the fastener into an opening in the work piece, the first portion of the fastener being positioned on a blind side of the work piece, an opposing portion of the fastener being positioned on an access side of the work piece and an intermediate portion having a length substantially equal to a thickness of the work piece;

moving the tapered segment of the mandrel into contact with the opposing end of the fastener, a region of the reduced perimeter of the tapered segment at least partially positioned within an opening in the fastener while the cold working perimeter remains located slightly outside the opening in the fastener;

seating the mandrel against the opposing end of the fastener;

axially drawing the rod from the blind side toward the access side of the work piece in an amount sufficient to cause buckling in a region of the fastener, the buckled region of the fastener forming a flange on the blind side of the work piece;

driving the cold working perimeter and the tapered segment of the mandrel through the opening in the fastener; and radially expanding the intermediate portion of the fastener between the blind side and the access side of the work piece with the cold working perimeter section of the mandrel.

2. The method of claim 1 wherein seating the mandrel against the opposing end of the fastener comprises increasing the pressure by introducing fluid pressure into one of the working chambers within the tool.

3. The method of claim 1 wherein driving the cold working perimeter of the mandrel and the tapered segment through the opening in the fastener results from the mechanical cooperation between the rod and the mandrel after the flange on the blind side of the work piece has been formed.

4. The method of claim 1 wherein axially drawing the rod from the blind side toward the access side of the work piece in the amount sufficient to cause buckling in the region of the fastener includes the region of the fastener having a reduced thickness.

5. The method of claim 1 wherein axially drawing the rod from the blind side toward the access side of the work piece comprises moving the rod relative to the mandrel.

6. The method of claim 1 wherein axially drawing the rod and driving the cold working perimeter is accomplished contemporaneously to laterally and torsionally secure the fastener in the work piece.

7. A method of securing a fastener in an opening formed in a work piece having an access side and a blind side using a tool, the fastener having a leading portion, a trailing portion, an opening formed in the trailing portion, an intermediate portion having a length substantially equal to a thickness of the work piece and located between the access side and blind side of the work piece, and an engagement portion formed within the opening proximate the leading portion, the tool comprising a housing, a mandrel, and a rod, wherein the mandrel comprises a reduced outer perimeter portion, an expanded outer perimeter portion, a tapered outer perimeter portion extending between the reduced and the expanded outer perimeter portions, and a passage, and wherein the rod comprises a fastener engaging portion, the rod being received by the passage of the mandrel and selectively operable to rotate about a longitudinal axis of the rod, the mandrel axially displaceable with respect to the longitudinal axis of the rod, the method comprising:

engaging the engagement portion of the fastener with the fastener engaging portion of the rod;

inserting the fastener in the opening in the work piece from the access side of the work piece such that at least a portion of the engagement portion of the fastener extends beyond the blind side of the work piece;

buckling a section of the leading portion of the fastener to form a flange on the blind side of the work piece; and radially expanding the intermediate portion of the fastener with the expanded outer perimeter of the mandrel to create an interference fit between the intermediate portion of the fastener and the opening in the work piece.

8. The method of claim 7 wherein engaging the portion of the fastener with the rod occurs before inserting the fastener in the opening in the work piece.

9. The method of claim 7 wherein buckling a section of the leading the portion of the fastener to form a flange on the blind side of the work piece comprises longitudinally rotating the rod in a first direction to draw the leading portion of the fastener a sufficient distance toward the trailing portion of the fastener, the buckling occurring in a reduced wall portion of the fastener.

10. The method of claim 9, further comprising:

longitudinally rotating the rod in a second direction, opposite the first direction, a sufficient amount to disengage the fastener engaging portion of the rod from the engagement portion of the fastener; and withdrawing the rod from the opening in the trailing edge of the fastener.

11. The method of claim 7 wherein radially expanding the intermediate portion of the fastener with the expanded outer perimeter of the mandrel comprises axially displacing the mandrel with respect to the rod while the rod is engaged with the engagement portion of fastener.

12. The method of claim 7, further comprising:

seating the mandrel against the trailing portion of the fastener before buckling the portion of the fastener.

13. The method of claim 7, further comprising:

locating the reduced outer perimeter portion of the mandrel and a length of the tapered outer perimeter of the mandrel in the opening of the fastener before buckling the portion of the fastener.

14. The method of claim 7 wherein securing the fastener in the opening formed in the work piece includes the reduced outer perimeter portion, the expanded outer perimeter portion, and the tapered outer perimeter portion being circular.

* * * * *